United States Patent [19]

Freeze et al.

[11] Patent Number: 4,879,612

[45] Date of Patent: Nov. 7, 1989

[54] HEAD POSITIONING SERVO-MECHANISM WITH ERROR REDUCTION CAPABILITIES

[75] Inventors: Robin J. Freeze, Milpitas; John L. Grimsley, Los Altos, both of Calif.

[73] Assignee: Data Technology Corporation, Santa Clara, Calif.

[21] Appl. No.: 935,687

[22] Filed: Nov. 26, 1986

[51] Int. Cl.⁴ .................. G11B 21/08; G11B 21/10
[52] U.S. Cl. ......................... 360/78.06; 360/78.09; 360/78.14
[58] Field of Search ............. 360/77, 78, 77.02, 78.09, 360/78.14, 78.06; 318/561

[56] References Cited

U.S. PATENT DOCUMENTS

| | | | |
|---|---|---|---|
| 4,462,053 | 7/1984 | Lum et al. | 360/78 |
| 4,488,189 | 12/1984 | Axmear et al. | 360/78 |
| 4,679,103 | 7/1987 | Workman | 360/77 |

OTHER PUBLICATIONS

IEEE Transactions or Magnetics, vol. Mag—17, No. 4, Jul. 1981, C. Maury, High Track Denisty for Magnetic Disk Drives with an "Embedded Servo" Positioning System, p. 1396.

Primary Examiner—Alan Faber
Assistant Examiner—David L. Robertson
Attorney, Agent, or Firm—Ladas & Parry

[57] ABSTRACT

A velocity servo system for a disk drive, the servo system being responsive to digital signals and generating a control signal for moving a read head of the disk drive from a current track position to a commanded track position. The servo system includes a circuit for reading current track address information and servo bursts recorded on a disk in said disk drive and for generating threshold signals when said read servo bursts are of a predetermined amplitude. An appropriately programmed data processing system provides a decoder responsive to the current track address read by the reading means and to the threshold signals for generating a current half track address, a first comparator which compares the current half track address with the commanded track position to generate half tracks-to-go digital data in response thereto; and generates commanded acceleration data in response to the half tracks-to-go data and to successive half track addresses. The servo system further includes a digital to analog converter for converting said commanded acceleration data to said control signal.

23 Claims, 13 Drawing Sheets

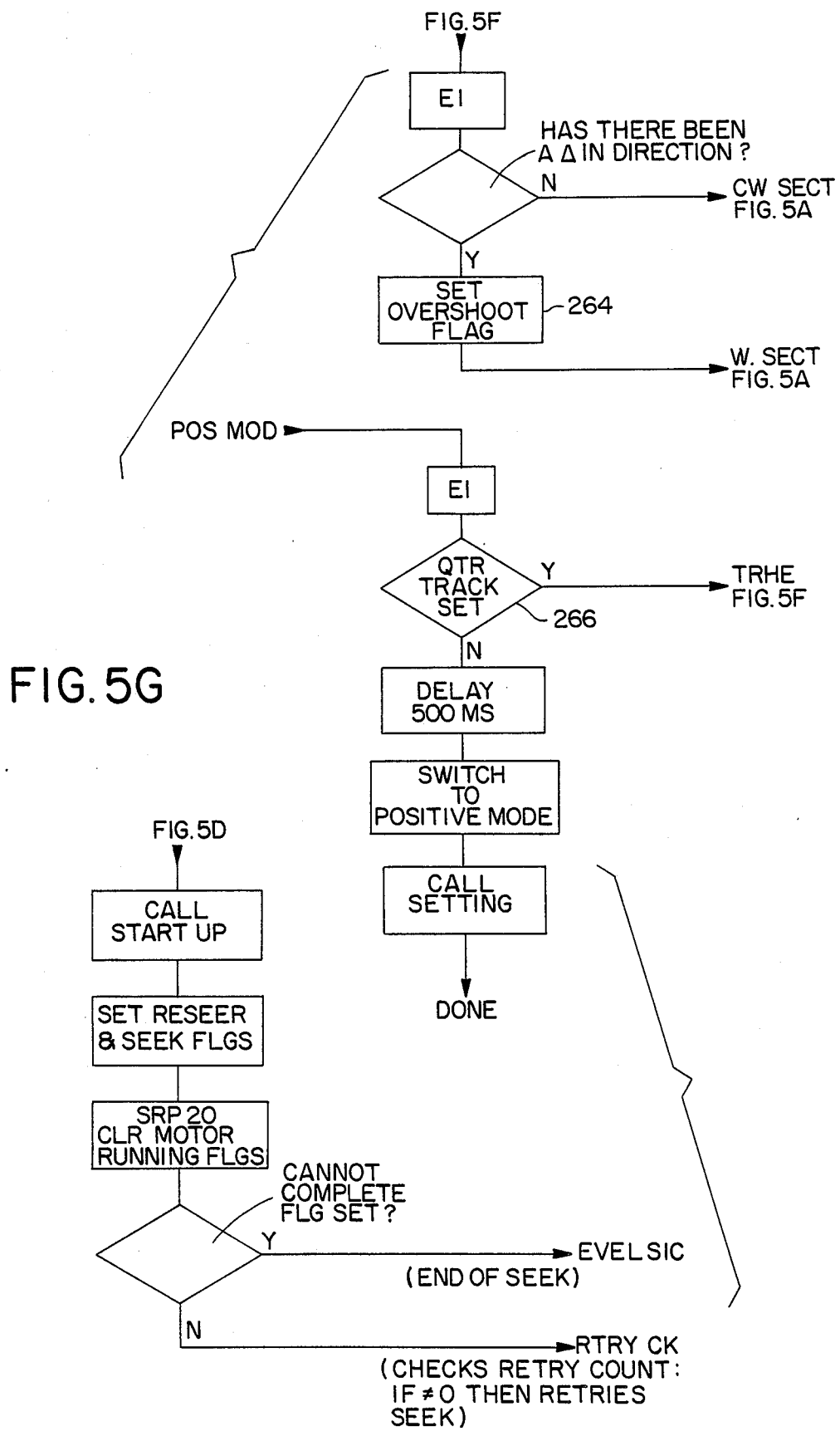

HEAD POSITIONING SERVO-MECHANISM WITH ERROR REDUCTION CAPABILITIES

BACKGROUND OF THE INVENTION

The instant invention is concerned with improvements to a servo system of the type which may be used with a disk drive to cause the read/write head to be moved from track to track on the disk installed in the disk drive. This operation is usually called a "head seek" in parlance of the disk drive industry since the read/write head is caused to seek a new track in response to a "seek command". The disk installed in the disk drive can either be a permanently installed disk (in which case the disk is usually a "hard disk") or a removable disk (in which case the disk is most often a "floppy disk" although removable hard disks are known).

Prior art servo systems, when used with disk drives, typically have two modes of operation: a velocity mode and a position mode. The servo is in its velocity mode when a head seek operation is underway and is in its position mode when the head is merely trying to accurately follow a given track around the disk (the tracks are normally concentric). The servo system disclosed by this patent also has these two modes of operation. The velocity mode is implemented by among other things, an appropriately programmed microprocessor, and therefore it is a "pure" digital implementation, whereas prior art devices used analog implementations. The position mode is implemented by analog circuitry, although in some embodiments the microprocessor is programmed to assist the analog circuitry in keeping the head accurately following a track.

BRIEF DESCRIPTION OF THE INVENTION

Briefly, and in general terms, the invention provides a velocity servo system for a disk drive, the servo system being responsive to digital signals and generating a control signal for moving a read head of the disk drive from a current track position to a commanded track position. The servo system includes a circuit for reading current track address information and servo bursts recorded on a disk in said disk drive and for generating threshold signals when said read sevro bursts are of a predetermined amplitude. An appropriately programmed data processing system provides a decoder responsive to the current track address read by the reading means and to the threshold signals for generating a current half track address, a first comparator which compares the current half track address with the commanded track position to generate half tracks-to-go digital data in response thereto; and generates commanded acceleration data in response to the half tracks-to-go data and to successive half track addresses. The servo system further includes a digital to analog converter for converting said commanded acceleration data to said control signal.

BRIEF DESCRIPTION OF THE DRAWINGS

FIGS. 5A through 5G form a composite logical flow diagram of the software implemented in the microprocessor of FIG. 1;

DETAILED DESCRIPTION OF A PREFERRED EMBODIMENT

DIGITAL SERVO SYSTEM

Figure 1:
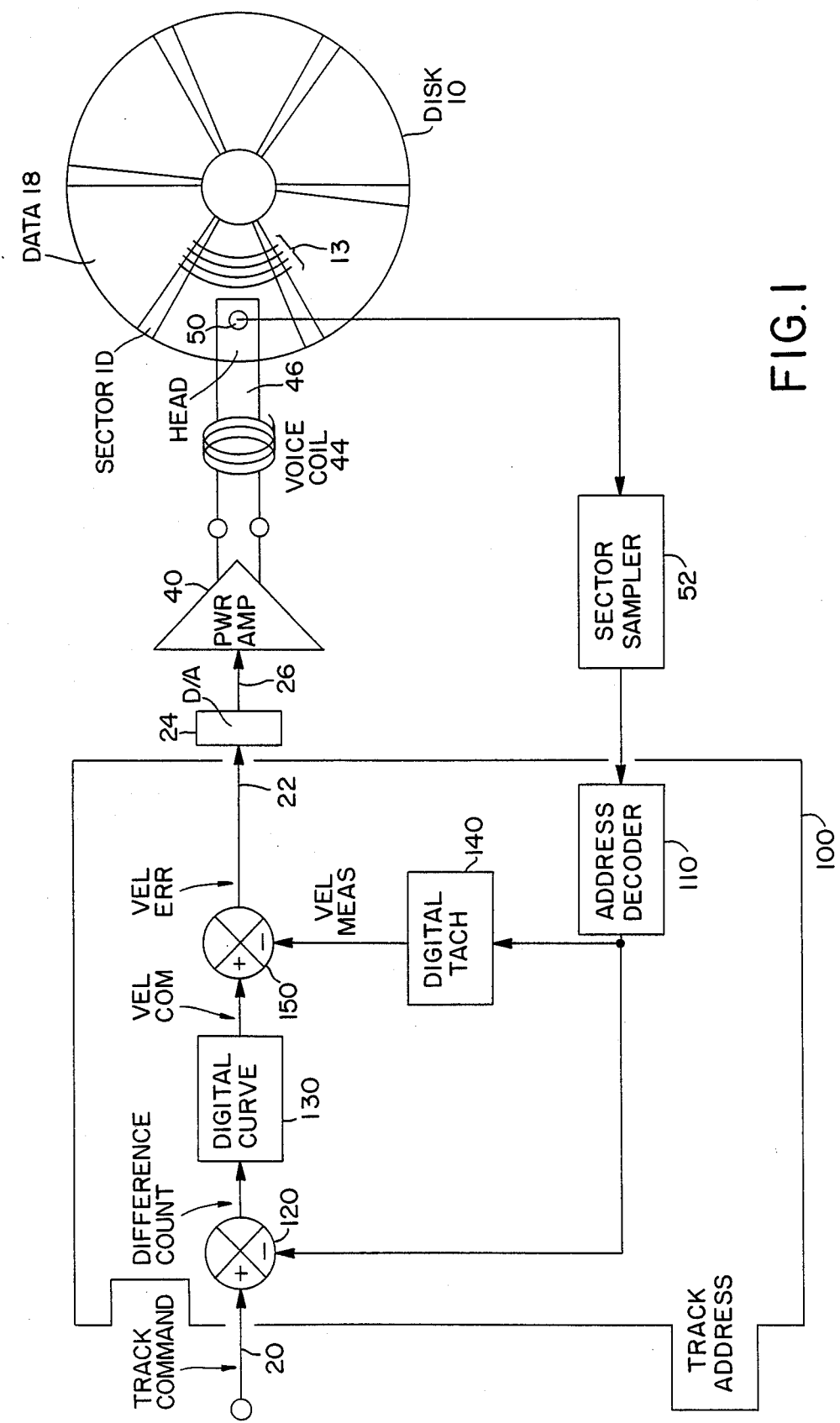
FIG. 1 is a block diagram of the digital servo system as it operates in the velocity mode.

FIG. 1 is a block diagram of the digital servo system of the present invention as it operates in its velocity mode. At the completion of the velocity mode of operation, the servo will shift to a position mode of operation which will be subsequently described with respect to FIG. 6. The servo system may be used as a portion of the electronics of a disk drive to control the positioning and movement of a read head 50 relative to a magnetic memory disk 10.

The velocity mode servo is preferably implemented using a suitably programmed microprocessor 100. The microprocessor 100 is responsive to a commanded track position data signal 20 and outputs a velocity error or desired accelertion signal 22. The desired acceleration signal 22 is applied to a digital to analog (d-a) converter 24 which converts the digital signal output by the microprocessor 100 into an analog signal 26. The signal 26 is eventually applied (through additional electronics which is described with reference to FIG. 6) to power amplifier 40. Power amplifier 40 drives voice coil 44 which mechanically moves the armature 46 upon which read write head 50 is disposed.

The sensitive surface of read write head 50 is disposed adjacent a moving magnetic media preferably in the form of disk 10. In a preferred embodiment, disk 10 is a five and one-quarter inch floppy disk with a high density magnetic media applied thereto. The disk 10 is typically installed in a semi-rigid jacket (not shown) and is rotated by a motor (also not shown) associated with the disk drive.

DATA RECORDED ON THE DISK—SERVO PULSES

Figure 2:
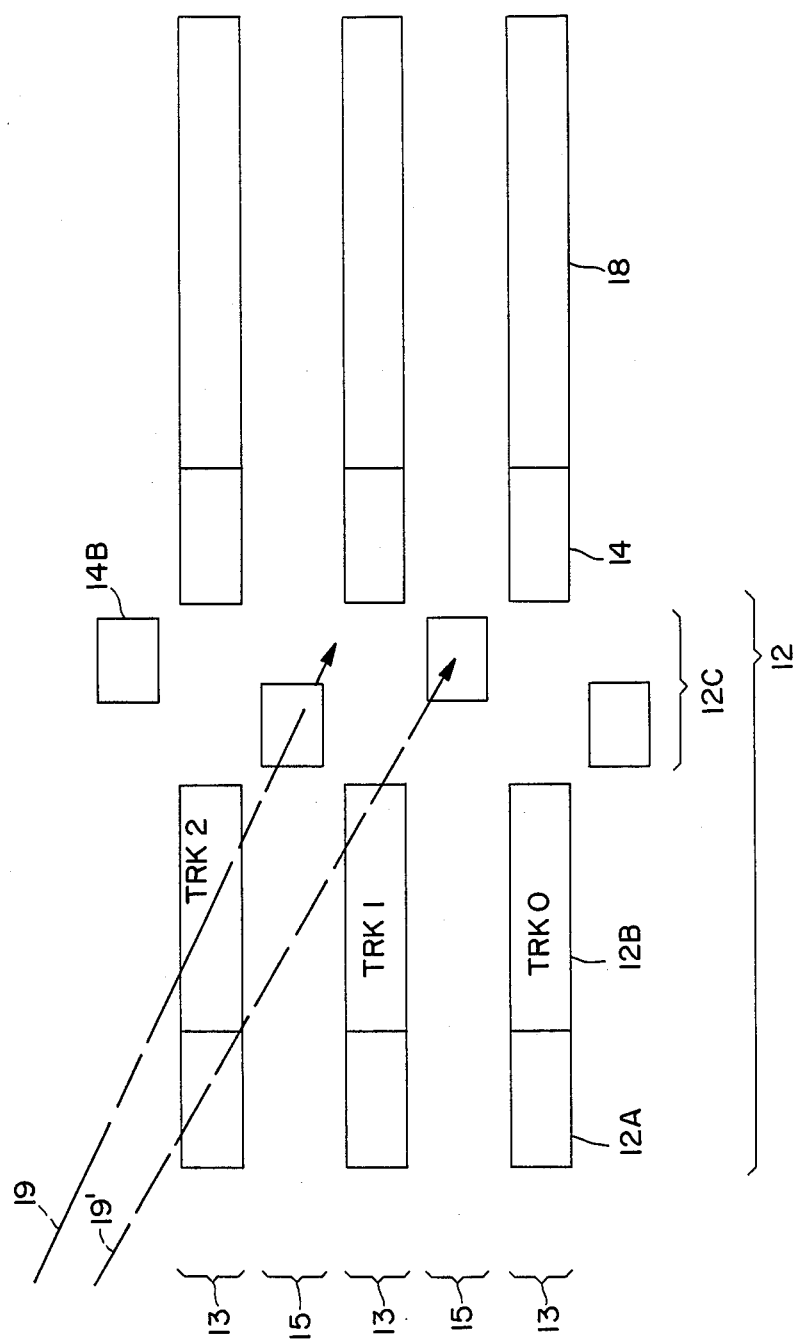
FIG. 2 is a schematic representation of a few sectors of information recorded on a disk.

Information is written on the disk in concentric tracks 13 and each track is divided into a number of data sectors 18 and identification sectors 12 (see also FIG. 2). For the ease of illustration, the number of data sectors 18 and identification sectors 12 shown in FIG. 1 are only six per track. However, those skilled in the art will appreciate that in actual commercial embodiments, many more data sectors and identification sectors are used and indeed, in accordance with the preferred embodiment of the invention described herein, seventy-eight data sectors and identification sectors are preferably used per track. Similarly, only a few tracks 13 are schematically depicted in FIG. 1, also for the ease of illustration. In accordance with the preferred embodiment of the invention, however, 301 tracks are preferably used on each side of the disk. Of course, the number of sectors per track, the number of tracks per side and whether or not one or both sides of the magnetic media are recorded upon are matters of design choice. Likewise, if both sides of the magnetic media 10 are recorded upon, then preferably two read write heads 50 will be employed, one for each side of the disk and appropriate switching mechanism will be used to control which head 50 is in service at a given time.

The read write head 50 reads the sector identification information 12, data 18 and other information recorded on the surface of the disk (which other information will be subsequently described with reference to FIG. 2), and provides that information to, among other things, sector ID sampler and half track detector circuit 52 which, in turn, supplies certain data to microprocessor 100. The data supplied by the sector ID sampler and half track detector circuit 52 will be described subsequently with respect to FIGS. 2 and 3.

Turning now to FIG. 2, there is shown a schematic representation of a few sectors worth of information recorded on the surface of disk 10. This information includes sector ID information 12 and data 18. The sector ID information 12 preferably includes a 9 bit track ID data field 12B which may be immediately preceded by a DC erase and sync byte area 12A. In order to provide greater resolution in the velocity servo and also to provide data useful for the position mode servo, servo bursts 12C are written to the disk 10 after the track ID 12A with a half track offset relative to tracks 13. The half track are represented by the numerals 15 in FIG. 2.

Immediately following the servo bursts a sector ID header 14 and the data 18 recorded in the sector. The ID header 14 includes a number of bits which identify the sector number, the side of the disk in use, the track number (if desired), various flags, check sums and/or other data integrity information. Since the servo mechanism of the instant invention only requires the track ID field 12B and servo-bursts 12C information to quickly and accurately move head 50 to the commanded track position, the data recorded in the ID header 14 and in the data sector 18 will not be described in greater detail since those design details do not have any particular bearing on the operation of the servo system described herein.

The boundaries between tracks 13 and half tracks 15 are shown with sharp lines in FIG. 2 for ease of illustration. Those skilled in the art will appreciate the fact that when the read head 50 is positioned exactly over the center of a track 13, the track ID field 12B, ID header 14 and data 18 is read most strongly by the read head 50. If the read head is positioned slightly off track, the strength of the read decreases. If the read head is centered over one of the half tracks 15, it picks up data from the two neighboring tracks 13 in more or less equal proportions which, of course, makes the data exceedingly difficult to read and interpret. It should be noted, however, that the servo bursts 12C are intentionally recorded in the half track areas and therefore, if the read head is properly positioned over the center of a track 13, it will read both neighboring servo bursts with equal intensity. If, however, the read head is slightly off the center of the track, then the data from one of the servo bursts will be stronger than the other servo burst. For example, considering track number 1, if the read head 50 is positioned slightly off the center of track number 1 in the direction of track number 2, then the first encountered servo burst immediately after the track ID field 12B will be stronger than the second burst. On the other hand, if the read head 50 is slightly off the center of the number 1 track in the direction of track number 0, then the second servo burst will be picked up more strongly than the first servo burst. Those skilled in the art will appreciate that the same convention works for all odd numbered tracks. Of course, for the even numbered tracks, if the read head 50 is slightly off track center towards a lower numbered track, then the first servo burst will be more strongly read whereas if the read head is slightly off track towards a higher numbered track, then the second servo burst will be the more strongly detected burst.

The amplitudes of the servo bursts are subtracted from each other to generate a position error (POS ERR) signal which is used when the servo system shifts to its position mode of operation as will be described with reference to FIG. 6. The servo bursts 12C are also used to generate certain digital signals which will now be described with reference to FIG. 3, which digital signals are used by the microprocessor to increase resolution of the velocity servo system.

Figure 3:
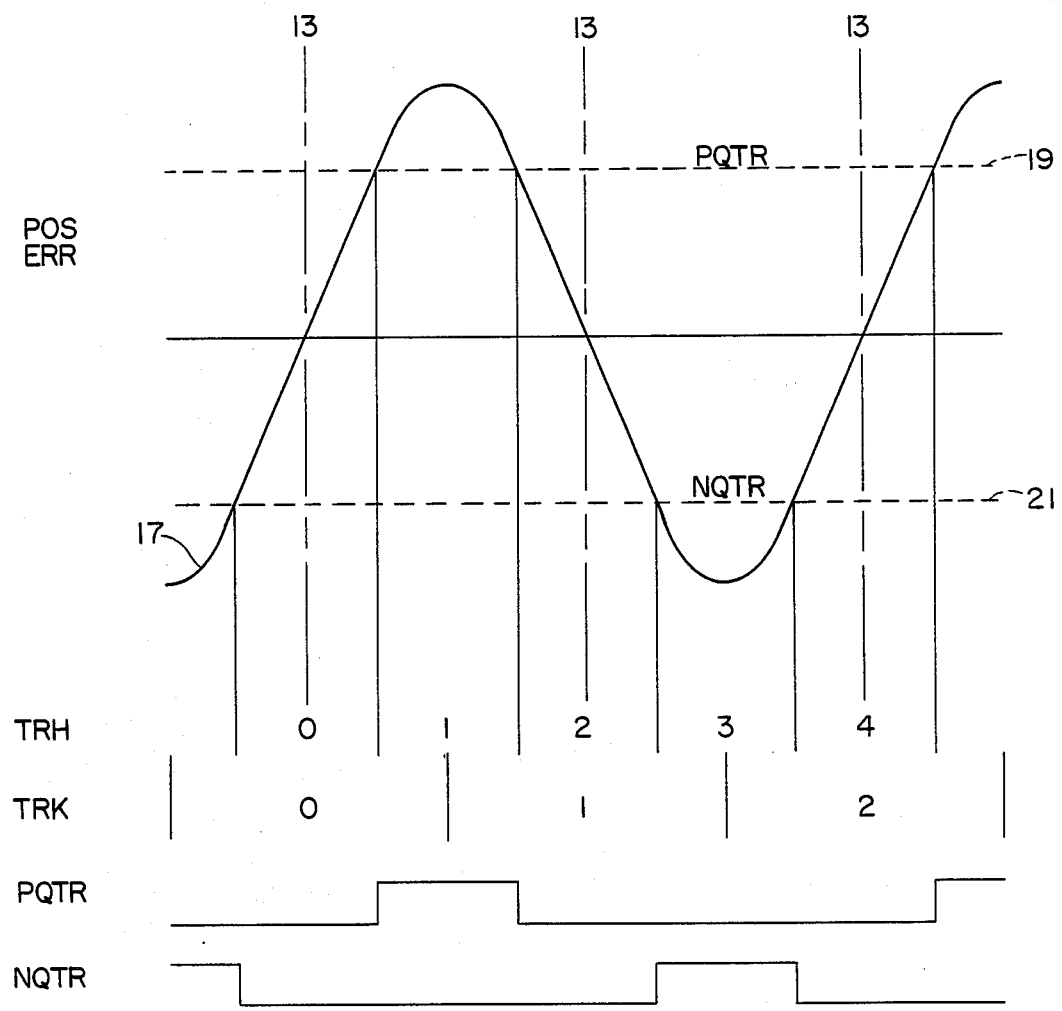
FIG. 3 is a diagram of the position error voltage and of two digital signals (PQTR & NQTR) as they occur versus head location relative to the centerline of a track.

Turning to FIG. 3, there is diagrammatically depicted the position error (POS ERR) signal voltage 17 as it varies with respect to the center lines of the first three tracks 0, 1 and 2 (labled TRK 0, 1 and 2 in FIG. 3). When the read head 50 is positioned immediately over the center line of a track 13, the position error voltage output is zero. With respect to track number 1, if the read head 50 is off the center line of the track in the direction of track number 0, then the position error voltage is positive, whereas if the read head 50 is off the center of the track in the direction of track number 2, then the position error voltage is negative. There are two thresholds established, one called the Positive Quarter TRack threshold 19 and the other called the Negative Quarter TRack threshold 21. When the position error signal exceeds the positive threshold 19, a digital signal PQTR goes positive whereas when the position error signal exceeds the negative threshold 21, a digital signal NQTR goes positive as can be seen in FIG. 3.

The PQTR and NQTR signals are all generated by the sector ID sampler and half track detector circuit 52 in FIG. 1. In addition to generating the two aforementioned digital signals, the sector ID sampler and half track detector 52 also extracts the nine bit track ID field 12B (see FIG. 2) from the information recorded on disk 10 and supplies all the track ID to microprocessor 100. The microprocessor 100 then uses the PQTR and NQTR signals to effectively add another bit to the nine bit track ID field so that the track address is resolved more finely, that is, the addresses are resolved to a half track address. The reason the is important will be become clear later in this description.

The polarity of the waveform in FIG. 3 may be inverted depending on whether the address of the target or commanded track address is even or odd. This inversion occurs since the position servo requires that the slope of the position error (POS.ERR) signal be negative in order to push the head 50 back toward the track center. Thus, if the position servo is to attampt to ride the centerline of a track where the slope of the POS-.ERR signal would otherwise be positive, the POS-.ERR signal must first be inverted. This selective inversion of the POS.ERR signal occurs before entering the position mode and preferably occurs before even initializating the system for the velocity mode. Thus the servo system "looks" at whether the target track is even or odd and then decides whether or not the POS.ERR signal is to be inverted. Of course, this inversion also affects the calculations of the half track addresses. In performing the half track address calculation, the microprocessor 100 at least needs to know the address of the current track and the state of the PQTR and NQTR signals. If the POS.ERR signal was first inverted before generating the PQTR and NQTR signals, then the microprocessor 100 must also take account of this fact and does so by also examining the address of the target track.

DIGITAL SERVO LOGIC

Turning again to FIG. 1, logically implemented in microprocessor 100 is an address decoder 110 which takes the 9 bit track ID 12B information and combines it with the two digital signals PQTR and NQTR to generate digital half track ID data. The half track ID data is equal to twice the track field ID 12B data, but the half track data is decremented by one if the head is actually in a half track 15 area in the direction of the lower numbered tracks from the track being read or is incremented by one if the read head is actually in the half track area 15 in the direction of a higher numbered track from the track actually read. This relationship between the whole track (TRK) and the half track (TRH) data can also be seen with reference to FIG. 3.

As will be seen, by having address decoder 110 convert the whole track data to half track data, greater resolution is obtained in the velocity servo and therefore the servo is capable of both greater accuracy and greater speed in finding a commanded track on the surface of the disk.

Considering the velocity mode servo system shown implemented by microprocessor 100 in FIG. 1, the track address (preferably in half tracks) generated by address decoder 110 is compared with a commanded track position in comparator 120. Naturally, if the track address supplied by decoder 110 is a half track address, then the commanded track address 20 should also be a half track address. Of course, those skilled in the art will appreciate that since the half track commanded address is equal to two times the whole track commanded address, this can be obtained by merely shifting the bits comprising the whole track commanded address one bit position to the left to convert it to a half track commanded address—a trivial function which microprocessor 100 can perform if needed.

Figure 4:
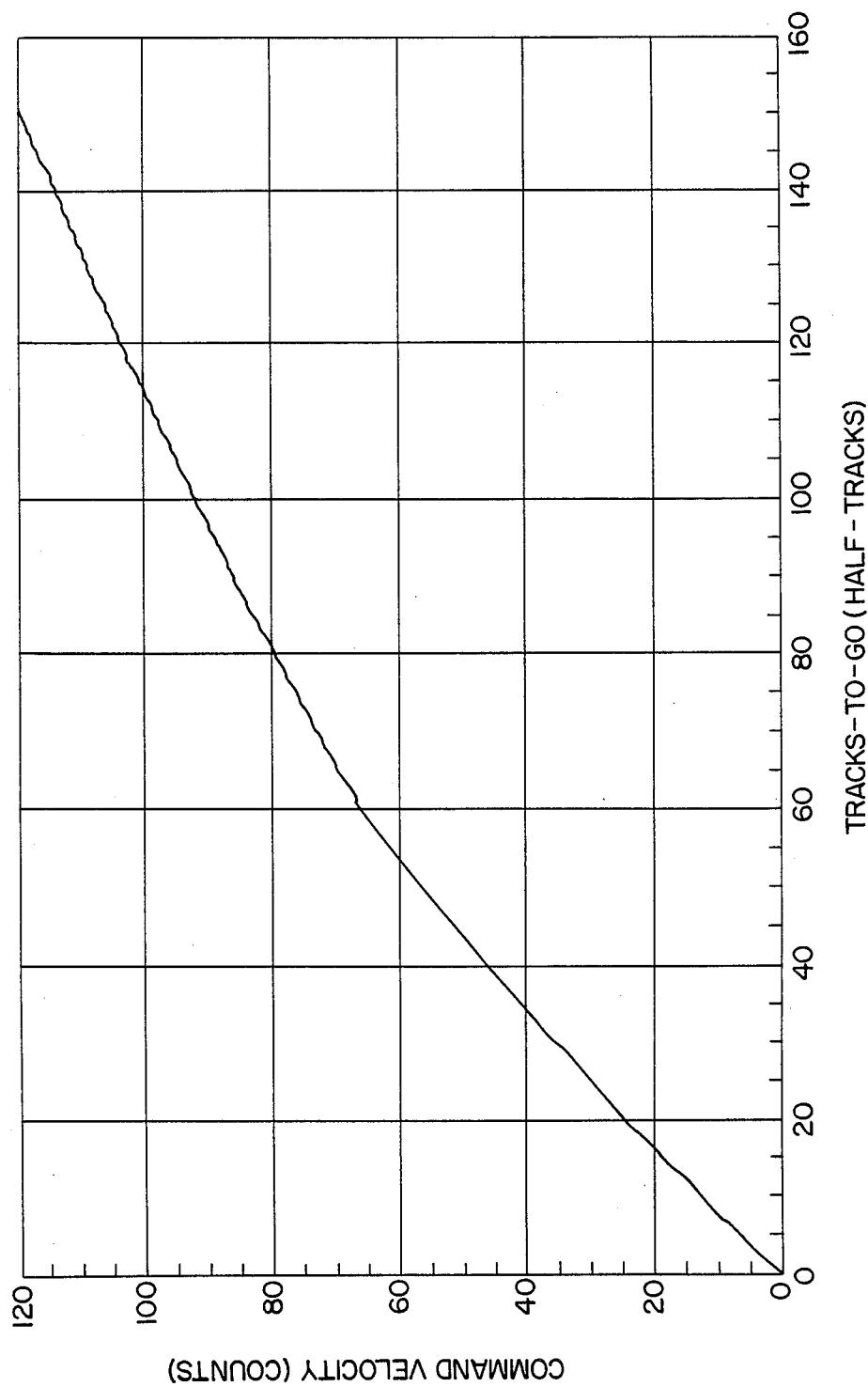
FIG. 4 is graph of data stored in the look up table of FIG. 1.

In any event, output of comparator 120, which is also preferably logically implemented in microprocessor 100, is supplied to a digital look-up table or digital curve 130. The output of comparator 120 essentially identifies the number of tracks to go and the "tracks-to-go" data is then converted by look-up table 130 to a velocity command signal. The data in look-up table 130 is determined empirically and is based upon a large number of variables including such things as the mass of armature 46 and head 50, the amount of power supplied by power amp 50 and the characteristics of voice coil 44. The velocity command indicates how fast the head should be moving across the disk based upon how far it is from its target track. Thus, if the head has one hundred tracks to move, the velocity command will be larger than if it only has say ten tracks to move. FIG. 4 depicts a portion of the data stored in look-up table 130. As can be seen, if the tracks to go in half tracks is equal to one hundred, the commanded velocity is about ninety units whereas if the tracks to go in half tracks is equal to ten, the commanded velocity is about ten units. Those skilled in the art will appreciate that disk 10 turns at a relatively constant speed. Indeed, the instant velocity servo system is designed to operate with a disk spinning at 600 RPM which means that the read head should cross a track ID 12B data field approximately every 1.28 milliseconds for a disk which is divided into seventy-eight essentially equally spaced sectors. This period is called the sector interval and it is equal to the period between the times that successive track ID fields 12B are under the read head 50. This also means that track ID's are sampled at a rate of 780 samples per second. As the head moves across the surface of the disk under the power of voice coil 44, in order to be positioned at a new commanded track location, there is a very good chance that head 50 will be able to read the track ID fields 12B as the head moves across the rotating disk 10. This is due to the fact that the track ID field 12B is quite short and therefore there is a good chance that the read head 50 will be able to successfully read the track ID data from a single track as the head moves relative to the rotating disk 10. For example, see FIG. 2 wherein a path 19 of read head 50 relative to the rotating disk 10 is schematically depicted. Of course, the head actually moves radially with respect to the center of disk 10, but its relative movement with respect to a rotating disk 10 would be a curve of which only a small portion thereof is depicted at numeral 19 in FIG. 2.

Those skilled in the art will appreciate that at each sector inverval, that is, each time the 9 bit track ID field has been rotated to a position where it can be possibly read by track head, it may, in fact, be unreadable by the head. By "unreadable", it is simply meant that it cannot be read accurately. The sector ID sampler and half track detector 52 may "think" that it has read a track ID field 12B correctly, but the results of the read operation may be occasionally spurious. As will be seen, the velocity servo can be provided with features to help overcome such spurious readings.

Returning again to FIG. 1, if the sector ID sampler and half track detector 52 is able to read accurately the track ID field 12B during consecutive sector intervals, the velocity with which the head is actually moving across tracks can be accurately measured by a digital tachometer 140. The design of digital tachometer 140 and how it may be designed to avoid or overcome spurious track ID's will be discussed subsequently. The digital tachometer 140 outputs an actual measured velocity signal which is compared by a digital comparator 150 with the commanded velocity signal output by look-up table 130 to generate a velocity error signal. The velocity error signal can also be thought of as a commanded acceleration signal since the greater the velocity error, the higher the commanded acceleration.

Those skilled in the art will appreciate that elements 110–150 can all be implemented with suitable hardware digital devices. It is believed preferable to implement these devices with an appropriate programmed microprocessor 100. The microprocessor used in the detailed disclosed embodiment herein is preferably a Z8 microprocessor manufactured by Zilog. Of course, those skilled in the art will appreciate that any one of a large number of other processors could be substituted for the Z8 if desired.

DIGITAL SERVO—OPERATION & RESOLUTION IMPROVEMENTS

The operation of the digital servo system is now briefly described. Initially it should first be assumed that the head is located at the presently commanded track position. It stays over the commanded track by means of a position servo which will be briefly described subsequently with reference to FIG. 6. When a new commanded track is provided to the servo system, it shifts to its velocity mode of operation which has been briefly described with reference to FIG. 1. Conceptually, in order to calculate the actual measured velocity, the digital tachometer must save the original track position and then in the next sector interval, save the next track position. A digital value proportional to measured velocity can be determined by merely subtracting the two positions, the original position from the next position. This is because, as it is well known, velocity is equal to distance divided by time. Here the distance is the difference in the two track positions and the time is constant, that is, one sector interval or 1.28 milliseconds. Since the sector interval is a constant, all that need be done is to take the difference between two track positions to determine the measured velocity. Of course, the measured velocity term is not an instantaneous velocity but rather an average velocity term. In any event, the resolution and accuracy of such a system would be equal to the physical distance between a whole track divided by the sector interval. Since the distance between whole tracks in accordance with the preferred embodiment of the disk drive is equal to 0.003 inch, the best speed resolution obtainable in accordance with the foregoing would be merely:

0.003 in/1.28 ms = 2.34 inches per second

Certain steps may be taken to improve the resolution of the system. Indeed, near the end of a seek command, the speed of the head 50 must be on the order of 0.5 in/sec to prevent the head 50 from overshooting the commanded track. Therefore, the resolution of the tachometer should be better than 2.34 in/sec if the servo system is going to have any chance of minimizing head overshoot at the conclusion of a seek command.

The foregoing analysis assumes that the address available is a whole track address. As has been previously described with reference to FIGS. 1-3, the microprocessor 100 is also responsive to certain other digital signals, PQTR and NQTR, so that address decoder 110 is capable of resolving the position of head 50 to a half track address. Assuming that half track addresses are used, the half track resolution is equal to the half track spacing divided by one sector interval or:

0.0015 in/1.28 ms = 1.17 inches per second.

Those skilled in the art will readily recognize that by inserting an extra bit into the track address so as to make it a half track address doubles the speed resolution of the digital servo.

Additionally, other design features may be included to further improve the speed resolution of the digital servo. For example, another way to improve resolution is to spread the distance traveled over two sector intervals such that the half track addresses are compared with other half track addresses taken two sector intervals previously. In this case, the resolution is equal to:

0.0015 in/2.56 ms = 0.58 inches per second.

Obviously, we have now effected a fourfold increase in resolution compared to the original assumptions. However, the last resolution improvement has a drawback. Now that the system is measuring distance over two sector intervals, it is using older data, i.e., the data is averaged over a longer time period. The data does not accurately reflect any acceleration which may have been present. To correct for this drawback, at every sector interval when the velocity calculation is made, a portion of the previous sector's error is summed in. This is equivalent to adding a term equivalent to acceleration into comparator 150.

Having found the actual velocity which the head 50 is moving, the actual velocity must be compared with the commanded velocity to determine whether the movement of the head should remain the same, be sped up or be slowed down. The commanded velocity is obtained by calculating the number of tracks to go to the commanded track and using that number as an entry into the look-up table 130.

Every time the head crosses a track ID field 12B, a new current address is decoded, which, in turn, causes new tracks-to-go data and new actual velocity data to be calculated. The new tracks-to-go data permits, in turn, a new commanded velocity to be obtained from the look-up table and compared with the new actual velocity data to accelerate or de-accelerate, as appropriate, the head 50.

VELOCITY MODE—SOFTWARE IMPLEMENTATION

FIGS. 5A through 5G depict a logical flow diagram of the software which should preferably be used by the microprocessor 100 to implement the digital servo control system.

Figure 5A:
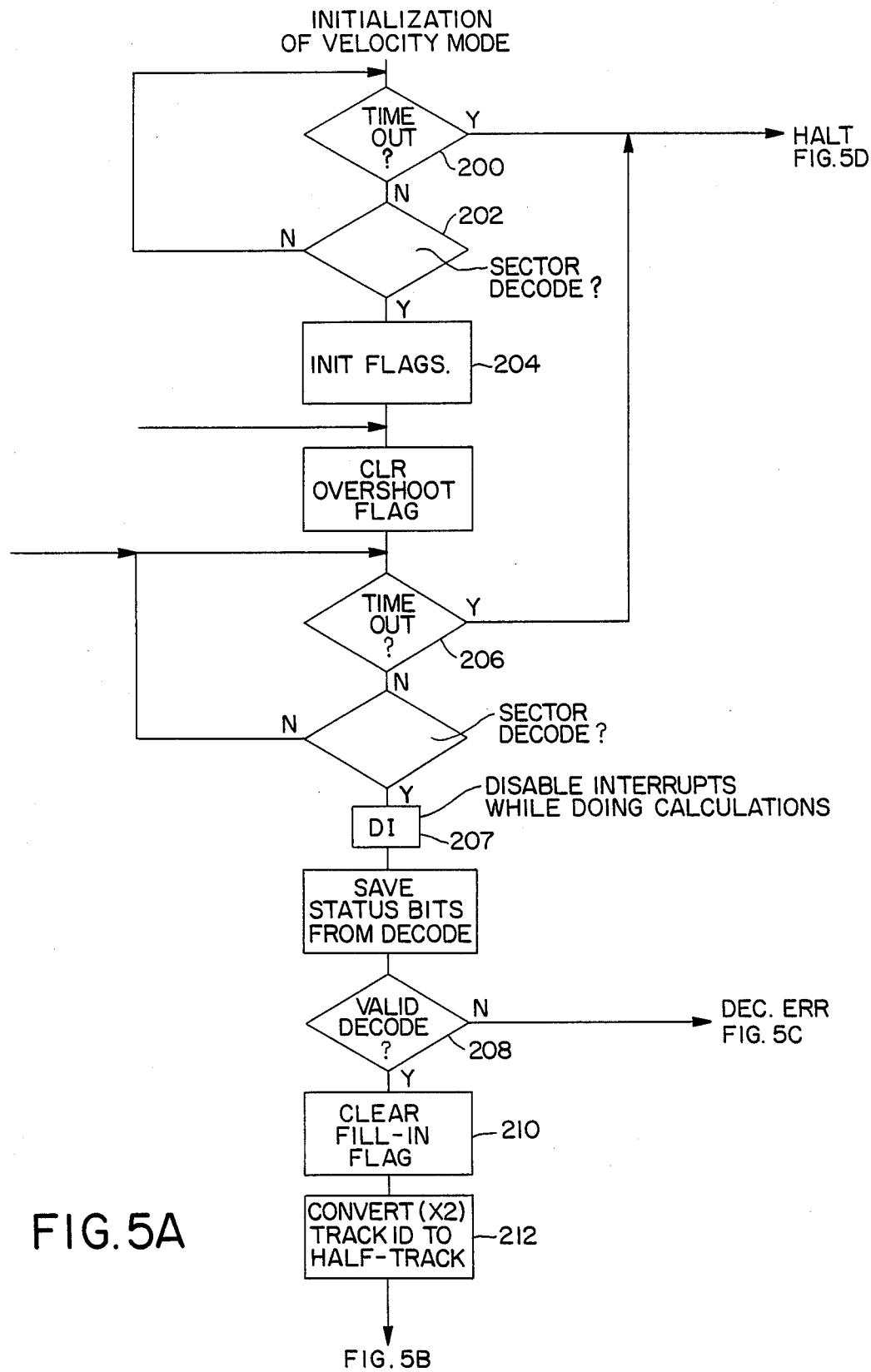

At the top of FIG. 5A it is assumed that the servo system has received a new commanded track position and it is about to shift from position mode control to velocity mode control. It system first waits for the start of a sector interval at blocks 200–202. If no sector interval occurs, a HALT routine is called (this would happen if the drive's motor failed to spin up the disk, for example). At block 204, a number of variables are initialized and the seek is begun by calculating the tracks-to-go data and setting the acceleration of the voice coil 44 based upon the commanded velocity term found in the look-up table.

Now that the head 50 has started to move, at block 208 the system looks for a valid decoding of the track ID field as determined by sampler 52. If the track ID data appears valid to the system hardware, the fill-in flag is cleared at block 210, otherwise a branch is taken to a decode error (DEC ERR) routine found on FIG. 5C. After block 210, the whole track data is converted to half track data by first multiplying the whole track data by two (i.e. by shifting the whole track data one bit to the left at block 212). Thereafter (see FIG. 5B), the PQTR and NQTR signals are tested to adjust the least significant bit (LSB) of the half track data at blocks 214 as previously described with reference to FIG. 3.

Now that the current half track address has been determined, the system also estimates what the half track address should be. If the difference between the estimated half track address and the actual read address (which may be a spurious address for the reasons mentioned previously) exceed certain limits, the actual (but presumptively spurious) address is thrown out and the estimated address is substituted therefor. The testing first determines whether or not the current address is within five half tracks of the commanded half track (block 216). If so (in which case the last five tracks to target flag is set), narrower limits are used in the testing. If the flag is not set, a branch is taken to routine HLMT (High LiMiT) found on FIG. 5C. Otherwise, if the flag is set, a test is made to determine if the difference is greater than two half tracks (block 218). If not, then the current half track address is accepted (SQUAL), otherwise a further test is made to determine if the difference is greater than ten half tracks (block 220). If not, a branch is taken to routine DFI (Determine Fill In), otherwise a branch is taken to FRCFI (FoRCe Fill In). If the last five tracks flag was not set, then blocks 222 set the aforedescribed limits at 3 and 18 half tracks instead of 2 and 10 half tracks.

With either a Force Fill In (FRCFI) or a Decode Error (DEC ERR), the estimated current half track address is substituted for the spurious decoded half track address at block 226. When in the Determine Fill In (DFI) mode, the substitution at block 226 occurs only if the Fill-in Count is odd. Since the Fill-in Count is incremented at block 224, under DFI the substitution only occurs every other successive decoded half track address which is not within the narrow range (i.e. 2 to 10 half tracks if the last five tracks flag is set or 3 to 18 half tracks if that flag is not set). The rationale for this is that within the narrow range there is some chance that the assumed spurious half track addresses may not really be spurious and therefore to help keep the digital servo system from getting "lost", the estimated half track address is only used every other time the decoded address appears erroneous for consecutive sector reads during a given seek command. If the decoded address is outside the narrow range, then under FRCFI or DEC ERR, the estimated address is automatically utilized. If in this process the Fill-in Count becomes equal to five (i.e. five successive erroneous addresses have been decoded), the seek is halted by a branch (see block 228) to the HALT routine.

Upon encountering an acceptable track address (SQUAL), the Fill-in Count is reset to zero (block 230).

Blocks 232 (FIG. 5D) check to determine that the decoded half-track address is an acceptable address given the number of tracks on disk 10. The inner guard band corresponds to whole track addresses less than zero, but greater than $-5$. The outer guard band addresses correspond to whole track addresses greater than 301 but less than 307. A successful exit from block 232 results in a branch to FULL TRK routine on FIG. 5E. An unsuccessful exit is via GBABORT (Guard Band ABORT) to the HALT routine (blocks 234) if the head gets too far into the guard band (it should only be in the guard band if the servo system overshoots a seek to track zero, for example).

The tachometer is implemented at blocks 236, with the current track address being compared not with the first previous track address, but with the second previous track address (the address decoded two sector intervals prior to the current track address). In order to improve the timeliness of the velocity data and make it more indicative of recent head acceleration, a portion of commanded acceleration term is subtracted from the difference of the track addresses (the difference between the current half track address and the half track address determined two sector intervals previously) at block 240. The tracks-to-go data is calculated at block 238 and the commanded velocity is found from the look up table stored in memory (preferably in a Read Only Memory) at block 242, while the five track to target flag is set or cleared at blocks 244.

The velocity error is determined at block 246 where the difference between the commanded velocity found at block 242 and the actual velocity found at block 240 is determined. The result is stored at block 248 for use at block 240 during the next sector interval and depending on whether or not the OVERSHOOT flag is set, the result is either multiplied by six (block 252) or seven (block 250) and the d-a converter 24 (FIG. 1) is updated at block 254.

Figure 5B:
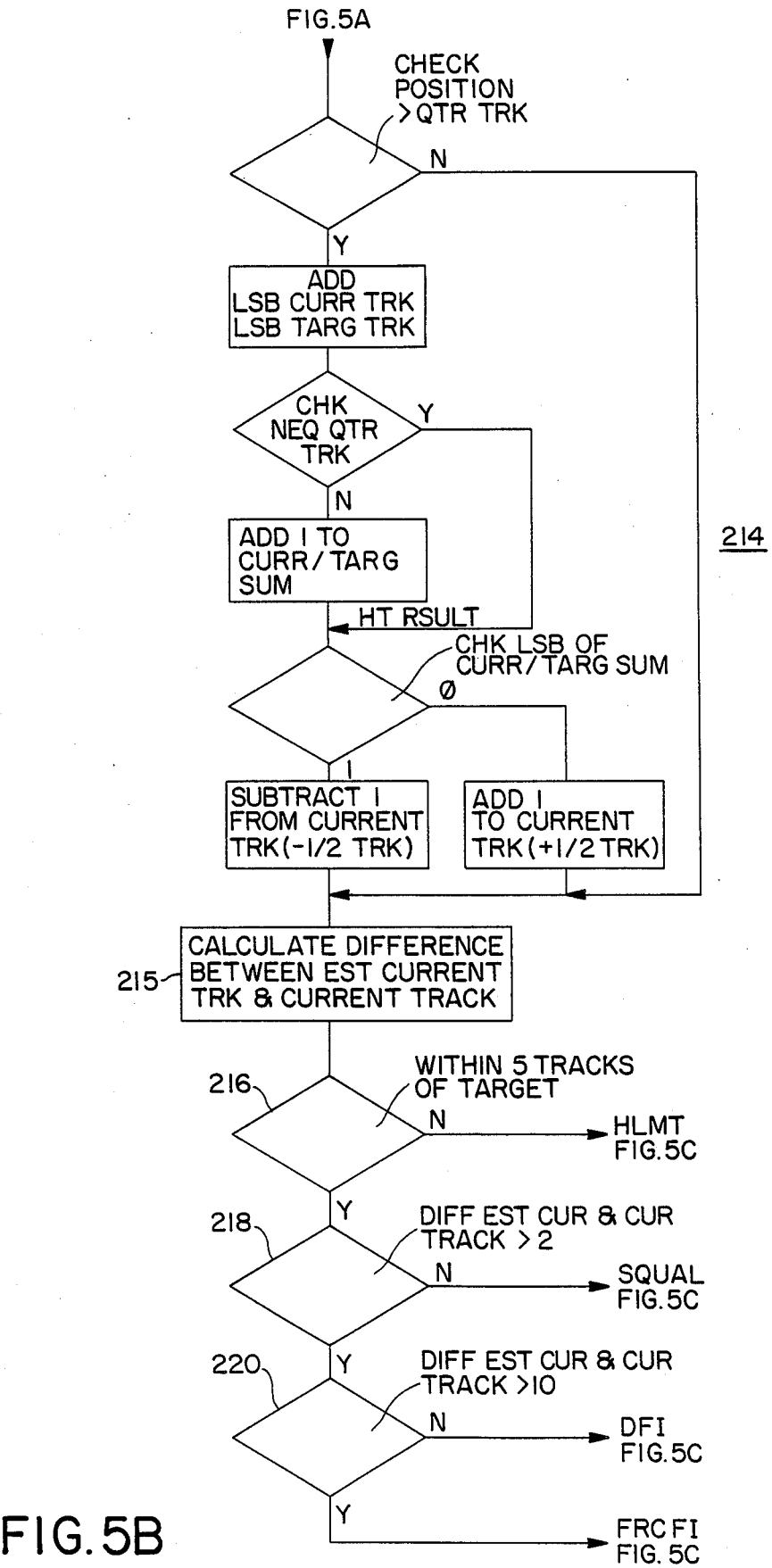
Figure 5C:
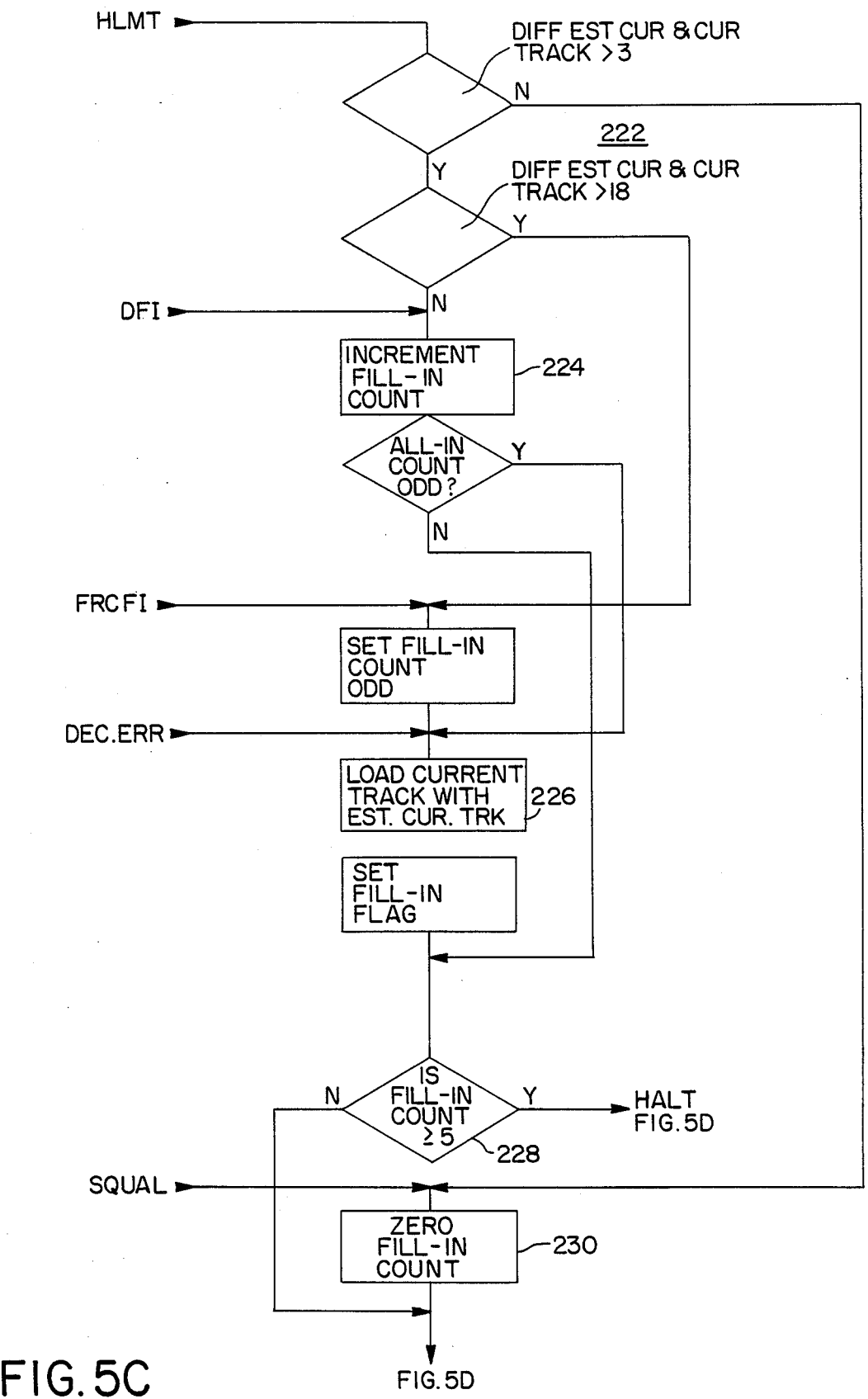
Figure 5D:
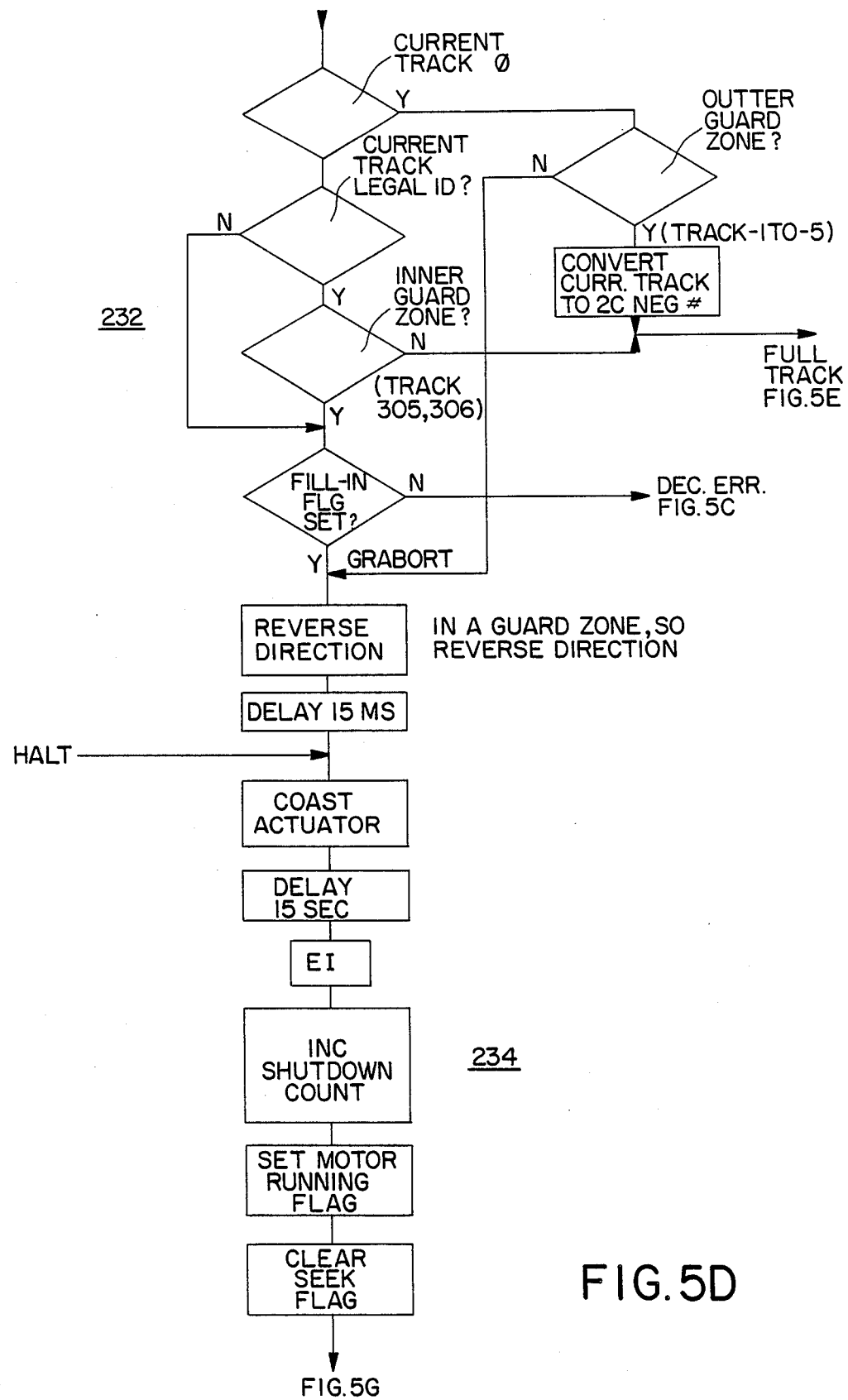
Figure 5E:
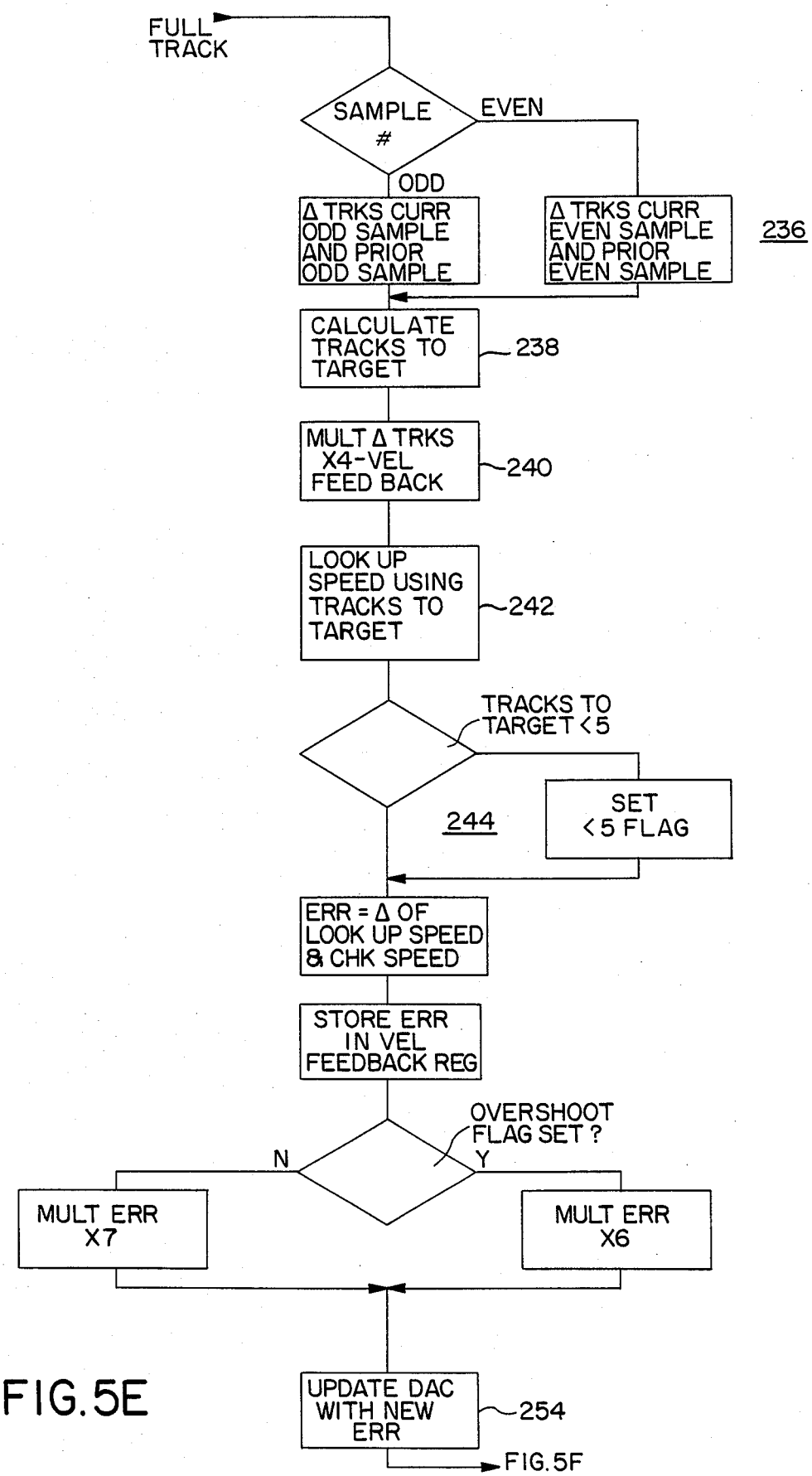
Figure 5F:
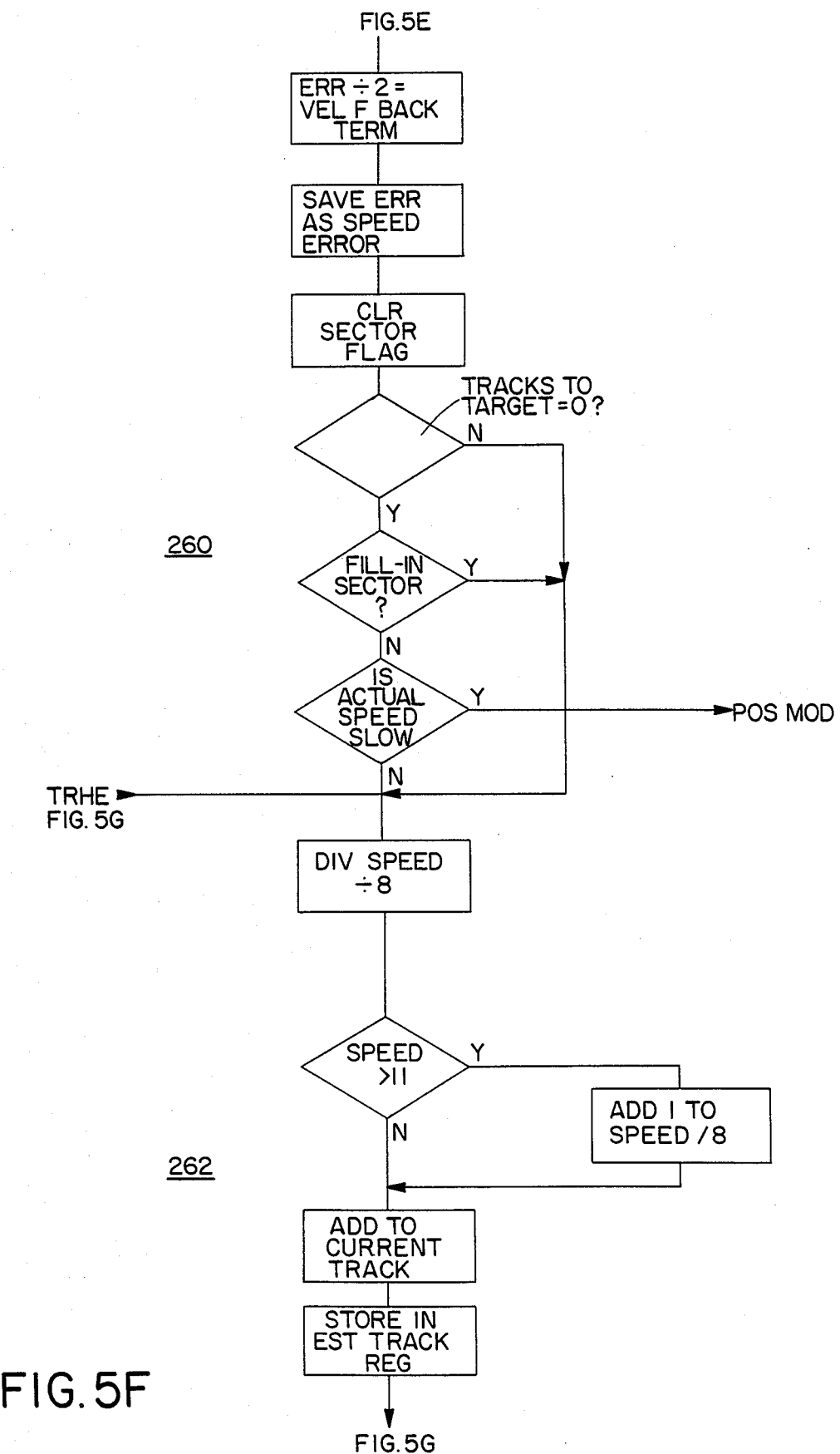

Turning to FIG. 5F, tests are made at blocks 260 to determine whether or not the commanded track (i.e. the target track) has been reached and other conditions satisfied to exit velocity mode and enter position mode. If so, a branch is made to POS MODE (FIG. 5G). If the servo is to stay in the velocity mode, the estimated half track position for the next sector interval is calculated at blocks 262, using the following formula:

$$TRK_E = TRK_C + (K_S * SPT) + (K_T * SPE)$$

where:
 $TRK_E$ = Estimated half track address at next sector interval
 $TRK_C$ = Current half track address
 $K_S$ = 0.125
 $K_T$ = 0.0625
 SPT = Current velocity
 SPE = Current Speed Error (i.e. commanded acceleration)

It is to be noted that the results of the estimated half track address is stored for use during the next sector interval in the calculation at block 215 (FIG. 5B). After storing the estimate, a test is made to determine whether a change in direction has occurred and if so the overshoot flag is set at block 264 (FIG. 5G) and then control is transferred to blocks 206 to await the next sector interval and to readjust as necessary the commanded acceleration of the head 50 while remaining in the velocity mode. Of course, during the very first sector interval under velocity mode control there is as yet no estimated half track address available, so at block 204 the current half track address is inserted into the memory location for the first estimate.

In the POS MOD routine (FIG. 5G), a test is made at block 266 to determine whether or not the head is within the track (i.e. are both PQTR and NQTR signals are a logical zero?). If so, after a short delay of 500 microseconds, the position mode switches 34 (FIG. 6) are set to position mode operation otherwise control is transferred back to velocity mode (via TRHE on FIG. 5F).

An assembly language listing in Z8 assembly language of software implementing the flow diagram of FIGS. 5A through 5G can be found in appendix I hereto.

POSITION MODE OPERATION—DYNAMIC BRAKING

Figure 6:
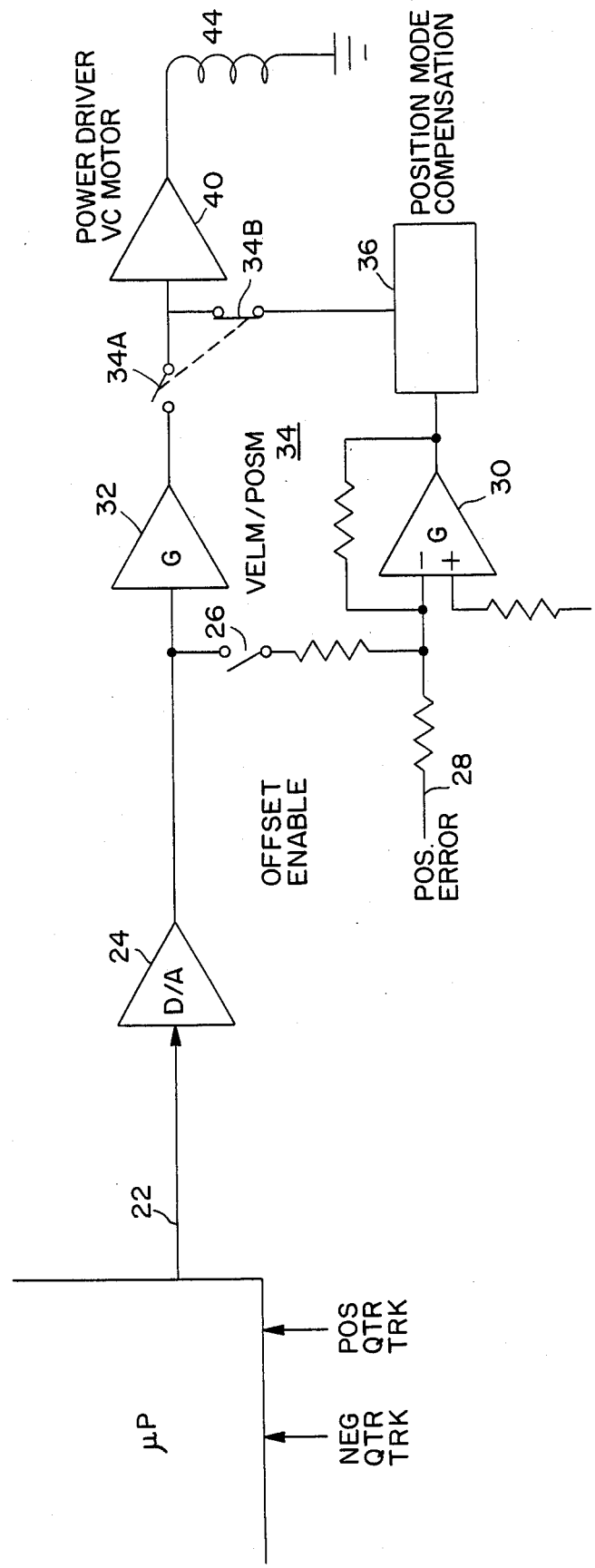
FIG. 6 is a block diagram of the servo system as it operates in the position mode.

FIG. 6 is a logical schematic diagram of the circuits used to invoke the position mode at the conclusion of the velocity mode of operation.

In the velocity mode switch 34A is closed, while switches 26 and 34B are open, so the output of the d-a converter 24 is applied to the power amplifier 40 through a gain stage 32, for example.

In the position mode, if the microprocessor detects a PQTR or NQTR signal and based upon the polarity of the target track number (odd/even) and which quarter track signal (PQTR or NQTR) was true, it will apply a value through the d-a converter 24 and close enable offset switch 26. The d-a converter then provides an offset voltage to the POS ERR signal of appropriate polarity to assist the POS ERR signal in braking the movement of the head 50 across a track as the servo system is attempting to settle the head on the commanded or target track at the end of a head seek.

Upon entering the position mode, switch 34A is opened and switch 34B is closed and the POS ERR voltage derived as described with reference to FIG. 3 is applied on line 28 through a gain stage 30 and a compensation circuit 36 to power amplifier 40. When entering the position mode, the head 50 has a tendency to oscillate briefly over the commanded track due to the dynamic nature of trying to stop a quickly moving mass. Naturally, it is desirable to damp out or settle such oscillatory movement as quickly as possible. To this end, the microprocessor 100 is preferably programmed to provide dynamic braking to the voice coil 44 by closing switch 26 under certain conditions so that the output of the d-a converter 24 is summed with the analog POS ERR signal at stage 30 in the position mode of operation. The dynamic braking injected by the digital servo system causes the head to move back toward the centerline of the track even more strongly than it would solely in the presence of the analog POS ERR signal when the head crosses oven the boundaries defined by the PQTR and NQTR signals (See FIG. 3).

Figure 7:
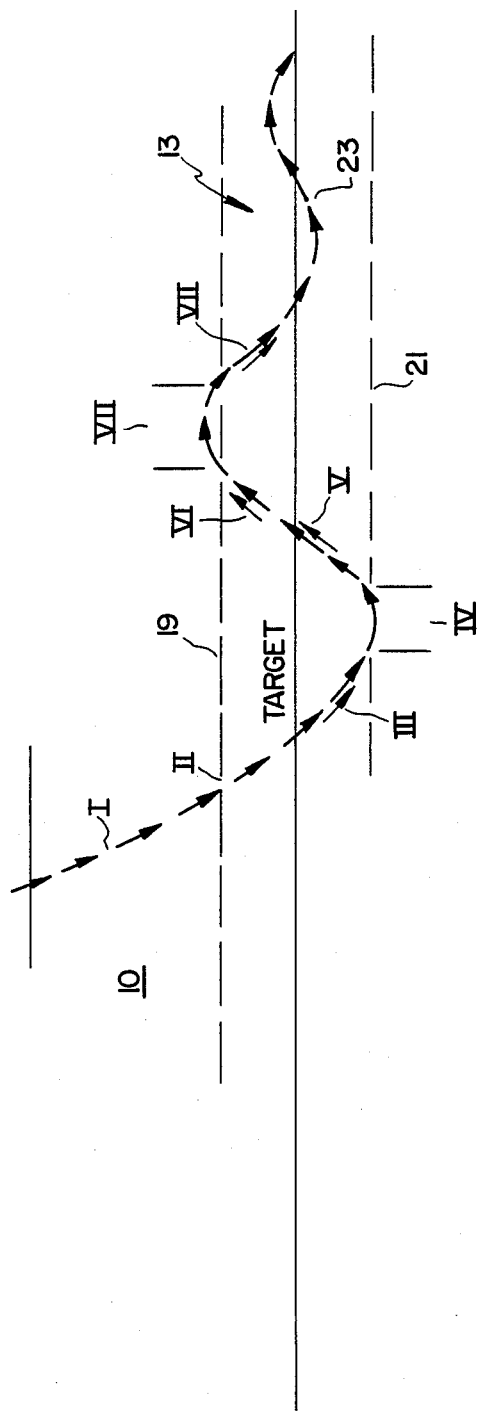
FIG. 7 is a diagram in plan view of a target track on the surface of a disk with the path of the read/write head as it concludes a head seek operation depicted thereon.

Turning now to FIG. 7, there is shown diagramically an enlarged plan view of the surface of disk 10 and particularly of a target track 13 thereupon. The path of the head 50 as it approaches the target track at the end of a seek command is shown by a dashed line 23. In the vicinity of Point I the servo system is still operating in its velocity mode of operation. When the head 50 reached Point II, servo system electronics switch to the position mode by closing switch 34B and opening switch 34A (FIG. 6) since the test performed at block 266 (FIG. 5G) of the logicial flow diagram has been satisfied (the signals PQTR and NQTR are both logically false indicating that the head is within the target track as it is bounded by thresholds 19 and 21).

Due to its momentum, the head 50 may pass over the centerline of the target track and the POS ERR signal at Point III is active to decelerate head 50 and to push it back towards the centerline. If the head in its overshoot passes over threshold 21 (See Point IV) (or threshold 19 if the approach to the target track were from the other direction), the microprocessor closes switch 26 (FIG. 6) and the output of the d-a converter 24 is summed with the POS ERR signal at stage 30 to provide additional current to the voice coil 44 to more quickly slow and return the head 50 back toward the centerline line of the track 13. Once the head crosses back over threshold 21 (see Points V and VI), position control is returns under the sole control of the POS ERR signal. If overshoot now occurs over threshold 19 (see Point VII), the output of d-a converter 24 is again summed with the POS ERR signal at stage 30 during the time that the head is over the adjacent half track 15, i.e., has exceeded the boundary of track 13 as defined by threshold 19. The head 50 again is controlled solely by the POS ERR signal after is passes over threshold 19 and if the magnitude of the POS ERR signal has been properly selected (which depends upon the speeds obtained by the head 50, its mass and the characteristics of the voice coil and power amplifier and therefore would in practice be likely to be obtained emphirically), the oscillatory movement of the head 50 will promptly damp out and the head will settle upon the target track.

Having described the invention in connection with certain preferred embodiments, modification may now suggest itself to those skilled in the art. The invention itself is therefore not to be limited to the disclosed embodiments except as specifically required by the appended claims.

What is claimed is:

1. A velocity servo system for a disk drive, said servo system being responsive to digital signals and generating a control signal for moving a read head of the disk drive from a current track position to a commanded track position, said servo system comprising:
   (a) means for reading current track address information and servo bursts recorded on a disk in said disk drive and for generating threshold signals when said read servo bursts are of a predetermined amplitude;
   (b) an appropriately programmed data processing system providing:
      (1) decoding means responsive to the current track address read by the reading means and to the threshold signals for generating a current half track address;
      (2) first comparator means for comparing the current half track address with the commanded track position to generate half tracks-to-go digital data in response thereto;
      (3) means for generating commanded acceleration data in response to the half tracks-to-go data and to successive half track addresses;
      (4) means responsive to the current half track address for predicting the half track address the read head will be positioned over when said reading means is next able to read track address data;
      (5) means for comparing the current half track address data with predicated half track address data; and
      (6) means for substituting the current half track address data with the predicated half track address data when the difference between the predicted half track address data and the decoded half track address data exceeds a predetermined amount; and
      (7) means responsive to said half tracks-to-go digital data for adjusting said predetermined amount as a function of the value of said half tracks-to-go digital data; said servo system further including:
   (c) digital to analog converter for converting said commanded acceleration data to said control signal.

2. A velocity servo system for a disk drive, said servo system being responsive to digital signals and generating a control signal for moving a read head of the disk drive from a current track position to a commanded track position, said servo system comprising:
   (a) means for reading current track address information and servo bursts recorded on a disk in said disk drive and for generating threshold signals when said read servo bursts are of a predetermined amplitude;
   (b) an appropriately programmed data processing system providing:
      (1) decoding means responsive to the current track address read by the reading means and to the threshold signals for generating a current half track address;
      (2) first comparator means for comparing the current half track address with the commanded track position to generate half tracks-to-go digital data in response thereto;

(3) means for generating commanded acceleration data in response to the half tracks-to-go data and to successive half track addresses;

(4) means responsive to the current half track address data for predicting the half track address the read head will be positioned over when said reading means is next able to read track address data;

(5) second comparator means for comparing the current half track address data with predicated half track address data;

(6) a counting means responsive to said second comparator means for counting successive comparisons of said second comparator means in which the difference between the predicted half track address data and the current half track address data exceeds a predetermined amount; and (7) means for substituting the current half track address data with the predicted half track address data when the difference between the predicted half track address data and the current half track address data exceeds said predetermined amount and the count in said counting means of a predetermined count;

(c) digital to analog converter for converting said commanded acceleration data to said control signal.

3. The velocity servo of claim 2 wherein said data processing system further includes means responsive to said half tracks-to-go digital data for adjusting said predetermined amount as a function of the value of said half tracks-to-go digital data.

4. In a velocity servo control system for a disk drive, said servo system being responsive to digital signals indicating commanded track position data, said servo system generating a control signal effective to move a read head of the disk drive from a current track position to the commanded track position, the improvement comprising:

(a) decoding means for decoding current half track position data by reading whole track address data recorded on a disk disposed in said disk drive and supplementing the whole track address data with half track information derived from servo bursts recorded on said disk;

(b) a first comparator means for comparing the current half track position data with the commanded track position data and for generating half tracks-to-go data in response thereto;

(c) means responsive to the current half track position data for predicting the half track position the read head will be positioned over when said decoding means is next able to decode track position data;

(d) means for comparing the decoded current half track position data with predicated half track position data;

(e) means for substituting the decoded current half track position data with the predicted half track position data when the difference between the predicted half track position data and the decoded current half track position data exceeds a predetermined amount; and (f) means responsive to said half tracks-to-go data for adjusting said predetermined amount as a function of the value of said half tracks-to-go data.

5. A velocity servo control system for a disk drive, said servo system being responsive to digital signals indicating commanded track position data, said servo system generating a control signal effective to move a read head of the disk drive from a current track position to the commanded track position, the improvement comprising:

(a) decoding means for decoding current half track position data by reading whole track address data recorded on a disk disposed in said disk drive and supplementing the whole track address data with half track information derived from servo bursts recorded on said disk;

(b) a first comparator means for comparing the current half track position data with the commanded track position data and for generating half tracks-to-go data in response thereto;

(c) means responsive to the current half track position data for predicting the half track position the read head will be positioned over when said decoding means is next able to decode track position data;

(d) means for comparing the decoded current half track position data with predicated half track position data;

(e) a counting means responsive to said comparator means for counting successive comparisons of said comparator means in which the difference between the predicted half track position data and the decoded current half track position data exceeds a predetermined amount; and (f) means for substituting the decoded current half track position data with the predicted half track position data when the difference between the predicted half track position data and the decoded current half track position data exceeds said predetermined amount and the count in said counting means is of a predetermined count.

6. The improved velocity servo of claim 5 wherein said servo further includes means responsive to said half tracks-to-go data for adjusting said predetermined amount as a function of the value of said half tracks-to-go data.

7. The improved velocity servo of claim 5, wherein said predetermined count includes the odd numbers one through five.

8. In a velocity servo control system for a disk drive, said servo system being responsive to digital signals indicating commanded track position data, said servo system including means for decoding current track position data recorded on a disk disposed in said disk drive and means for generating desired velocity data in response to tracks-to-go data, said servo system generating a control signal effective to move a read head of a disk drive from a current track position to the commanded track position, the improvement comprising:

(1) means responsive to the current track position data for predicting the track position the read head will be positioned over when said decoding means is next able to decode track position data;

(2) comparator means for comparing the current track position data with predicted track position data; and (3) means for substituting the current track position data with the predicted track position data when the difference between the predicted track position data and the decoded track position data exceeds a predetermined amount;

(4) means responsive to said tracks-to-go data for adjusting said predetermined amount as a function of the value of said tracks-to-go data.

9. A velocity servo system for a disk drive, said servo system being responsive to digital signals indicating commanded track position data, said servo system including means for decoding current track position data recorded on a disk disposed in said disk drive and means for generating desired velocity data in response to tracks-to-go data, said servo system generating a control signal effective to move a read head of a disk drive from a current track position to the commanded track position, the improvement comprising:
   (1) means responsive to the current track position data for predicting the track position the read head will be positioned over when said decoding means is next able to decode track position data;
   (2) comparator means for comparing the current track position data with predicted track position data;
   (3) means for substituting the current track position data with the predicted track position data when the difference between the predicted track position data and the decoded track position data exceeds a predetermined amount; and
   (4) counting means responsive to said comparator means for counting successive comparisons of said comparator means in which the difference between the predicted track position data and the decoded track position data exceeds a predetermined amount; and wherein said means for substituting the current track position data with the predicted track position data is only enabled to perform its substitution function when the count in said counting means is of a predetermined count.

10. The velocity servo of claim 8 wherein said decoding means is responsive to whole track address signals recorded on the disk and to servo bursts recorded on the disk to supplement the whole track address signals with signals derived from the servo bursts to generate half track position data and wherein said comparator means compares half track address signals.

11. A method of controlling the movement of a read head in a disk drive to move from a current track to a commanded track, said method comprising the steps of:
   (a) continuously attempting to read digital track address data and servo bursts stored on a disk disposed in the disk drive and using the address data and servo bursts to form half track address data;
   (b) comparing the currently read half track address data with the commanded half track position to generate half tracks-to-go data in response thereto;
   (c) converting the half tracks-to-go data to velocity data;
   (d) comparing the currently read half track address data with previously read half track address data and generating system velocity data in response thereto;
   (e) comparing the desired velocity data with the system velocity data and generating an electrical control signal in response thereto;
   (f) applying the electrical control signal to a motor for moving said read head;
   (g) comparing currently read half track address data with predicted half track position data;
   (h) substituting the predicted half track address data for the currently read half track address data when the difference between the predicted half track address data and the successfully read half track address data exceeds a predetermined limit; and
   (i) adjusting said predetermined limit as a function of the magnitude of the half tracks-to-go data.

12. A method of controlling the movement of a read head in a disk drive to move from a current track to a commanded track, said method comprising the steps of:
   (a) continuously attempting to read digital track address data and servo bursts stored on a disk disposed in the disk drive and using the address data and servo bursts to form half track address data;
   (b) comparing the currently read half track address data with the commanded half track position to generate half tracks-to-go data in response thereto;
   (c) converting the half tracks-to-go data to velocity data;
   (d) comparing the currently read half track address data with previously read half track address data and generating system velocity data in response thereto;
   (e) comparing the desired velocity data with the system velocity data and generating an electrical control signal in response thereto;
   (f) applying the electrical control signal to a motor for moving said read head;
   (g) comparing currently read half track address data with predicted half track position data;
   (h) counting successive occurrences in step (g) of the difference between the predicted half track position data and the currently read half track position data exceeding a predetermined limit; and
   (i) substituting the predicted half track position data for the currently read half track position data when the difference between the predicted half track position data and the currently read half track position data exceeds said predetermined limit and the result of said counting step being an odd count.

13. The method of claim 12, further including the step of adjusting said predetermined limit as a function of the magnitude of the half tracks-to-go data.

14. In an apparatus for controlling the movement of a read head in a disk drive to move from a current track to a commanded track, the improvement comprising:
   (a) means for continuously attempting to read digital track address data and servo bursts stored on a disk disposed in the disk drive and using the address data and the servo bursts to form half track address data;
   (b) means for comparing currently read half track address data with the commanded track position to generate half tracks-to-go data in response thereto;
   (c) means for comparing currently read half track address data with predicted half track position data;
   (d) means for substituting the predicted half track position data for the currently read half track position data when the difference between the predicted half track position data and the currently read half track position data exceeds a predetermined limit; and
   (e) means for adjusting said predetermined limit as a function of the magnitude of the half tracks-to-go data.

15. In an apparatus for controlling the movement of a read head in a disk drive to move from a current track to a commanded track, the improvement comprising:
   (a) means for continuously attempting to read digital track address data and servo bursts stored on a disk disposed in the disk drive and using the address data and the servo bursts to form half track address data;

(b) means for comparing currently read half track address data with the commanded track position to generate half tracks-to-go data in response thereto;

(c) means for comparing currently read half track address data with predicted half track position data;

(d) means for counting successive occurrences in step (c) of the difference between the predicted half track position data and the currently read half track position data exceeding a predetermined limit; and (e) means for substituting the predicted half track position data for the currently read half track position data when the difference between the predicted half track position data and the currently read half track position data exceeds said predetermined limit and the result of said counting step being an odd count.

16. The improvement of claim 15, further including:

(f) means for adjusting said predetermined limit as a function of the magnitude of the half tracks-to-go data.

17. A servo system for a disk drive, said servo system being responsive to digital signals and generating a control signal for moving a read head of the disk drive from a current track position to a commanded track position, said servo system comprising:

(a) means for reading current track address information recorded on a disk in said disk drive and detecting servo bursts recorded on the disk to generate digital threshold signals and an analog position error signal;

(b) means for switching the servo system form a velocity mode of operation to a position mode of operation when tracks-to-go digital data is equal to zero;

(c) a velocity servo for generating desired acceleration data in the form of a first analog signal, said analog signal being supplied as said control signal when said switching means is in its velocity mode; and (d) a position servo comprising:
 (1) means responsive to said position error signal for generating a second analog signal, said second analog signal being supplied as said control signal when said switching means is in its position mode; and
 (2) means responsive to said threshold signals for summing the output of the digital to analog converter with the position error signal when the read head deviates from the commanded track by more than a predetermined amount.

18. The servo system of claim 17 wherein said velocity servo further includes half track decoding means responsive to the read current track address information and to the detected servo bursts for forming the current track position data in terms of half tracks.

19. A method of controlling the velocity of a disk drive in response to digital signals indicating commanded track position data to generate a control signal effective to move a read head of a disk drive from a current track position to the commanded track position, said method comprising the steps of:

(1) calculating a predicted track position the read head will be positioned over when a decoding means is next able to decode track position data using prior velocity and position of the read head;

(2) comparing the current track position data with predicted track position data;

(3) substituting the current track position data with the predicted track position data when the difference between the predicted track position data and the decoded track position data exceeds a predetermined amount; and (4) adjusting said predetermined amount as a function of the value of said tracks-to-go data.

20. A method of controlling the velocity of a disk drive in response to digital signals indicating commanded track position data to generate a control signal effective to move a read head of a disk drive from a current track position to the commanded track position, said method comprising the steps of:

(1) calculating a predicted track position the read head will be positioned over when a decoding means is next able to decode track position data using prior velocity and position of the read head;

(2) comparing the current track position data with predicted track position data;

(3) substituting the current track position data with the predicted track position data when the difference between the predicted track position data and the decoded track position data exceeds a predetermined amount; and (4) counting successive comparisons of step (2) in which the difference between the predicted track position data and the decoded track position data exceeds a predetermined amount;

and wherein said step of substituting the current track position data with the predicted track position data is only performed when the count of step (4) is of a predetermined count.

21. The method of claim 19 wherein said decoding step is responsive to whole track address signals recorded on the disk and to servo bursts recorded on the disk to supplement the whole track address signals with signals derived from the servo bursts to generate half track position data and wherein each of said comparing steps compare half track address signals.

22. A velocity servo system for a disk drive, said servo system being responsive to digital signals and generating a control signal for moving a read head of the disk drive from a current position to a commanded position, said servo system comprising:

(a) means for reading current head position address information recorded on a disk in said disk drive;

(b) means responsive to the current head position address for predicting the head position address the read head will be positioned over when said reading means is next able to read head position address data;

(c) means for comparing the current head position address data with predicted head position address data;

(d) means for substituting the current head position address data with the predicted head position address data when the difference between the predicted head position address data and the decoded head position address data exceeds a predetermined amount;

(e) means for comparing the current head positions address with the commanded position to generate distance-to-go digital data is response thereto;

(f) means for generating said control signal as a function of the distance-to-go data; and (g) means responsive to said distance-to-go digital data for adjusting said predetermined amount as a function of the value of said distance-to-go digital data.

23. A velocity servo system for a disk drive, said servo system being responsive to digital signals and generating a control signal for moving a read head of the disk drive from a current position to a commanded position, said servo system comprising:
    (a) means for reading current head position information recorded on a disk in said disk drive;
    (b) means responsive to the current head position address data for predicting the head position address the read head will be positioned over when said reading means is next able to read head position address data;
    (c) comparator means for comparing the current head position address data with predicted head position address data;
    (d) a counting means responsive to said aforementioned comparator means for counting successive comparisons of said comparator means in which the difference between the predicted head position address data and the current head position address data exceeds a predetermined amount;
    (e) means for substituting the current head position address data with the predicted head position address data when the difference between the predicted head position address data and the decoded head position address data exceeds said predetermined amount and the count in said counting means is of a predetermined count;
    (f) comparator means for comparing the current head position address with the commanded position to generate distance-to-go digital data in response thereto;
    (g) means for generating said control signal as a function of the distance-to-go data; and
    (h) means responsive to said distance-to-go digital data for adjusting said predetermined amount as a function of the value of said distance-to-go digital data.

* * * * *